United States Patent [19]

Yagi et al.

[11] Patent Number: 4,923,637
[45] Date of Patent: May 8, 1990

[54] HIGH CONDUCTIVITY CARBON FIBER

[75] Inventors: Kiyoshi Yagi; Toshiaki Kanno; Toshio Inada, all of Shizuoka, Japan

[73] Assignee: Yazaki Corporation, Japan

[21] Appl. No.: 210,379

[22] Filed: Jun. 23, 1988

[30] Foreign Application Priority Data

Jun. 24, 1987 [JP] Japan .................. 62-155396
Jul. 17, 1987 [JP] Japan .................. 62-177272

[51] Int. Cl.$^5$ .............................................. H01B 1/06
[52] U.S. Cl. .................... 252/511; 252/502; 423/447.3; 423/448; 423/449
[58] Field of Search .............. 423/447.3, 448, 449, 423/453, 458; 524/495, 496; 252/371, 502

[56] References Cited

U.S. PATENT DOCUMENTS

| | | | |
|---|---|---|---|
| 3,723,605 | 3/1973 | Ram | 423/448 |
| 4,014,980 | 3/1977 | Fujimaki et al. | 423/448 |
| 4,426,368 | 1/1984 | Quella et al. | 423/449 |
| 4,435,375 | 3/1984 | Tamura et al. | 423/447.3 |
| 4,565,683 | 1/1986 | Yates et al. | 423/453 |
| 4,572,813 | 2/1986 | Arakawa | 423/447.3 |
| 4,578,286 | 3/1986 | Vasta | 252/511 |
| 4,604,276 | 8/1986 | Oblas et al. | 423/449 |
| 4,629,584 | 12/1986 | Yasuda | 252/511 |
| 4,664,900 | 5/1987 | Miyazaki et al. | 423/447.3 |
| 4,749,557 | 6/1988 | Yetter et al. | 423/453 |
| 4,770,867 | 9/1988 | Coubn et al. | 423/453 |
| 4,818,437 | 4/1989 | Wiley | 252/511 |
| 4,839,114 | 6/1989 | Delphin et al. | 252/511 |

FOREIGN PATENT DOCUMENTS

| | | | |
|---|---|---|---|
| 046077 | 2/1982 | European Pat. Off. | 423/449 |
| 104639 | 4/1984 | European Pat. Off. | 423/448 |
| 58-110493 | 7/1983 | Japan | 423/448 |
| 58-180615 | 10/1983 | Japan | 423/448 |
| 58-208112 | 12/1983 | Japan | 423/448 |
| 60-21806 | 2/1985 | Japan | 423/448 |
| 61-218661 | 9/1986 | Japan | 423/448 |
| 61-225327 | 10/1986 | Japan | 423/447.3 |
| 62-57927 | 3/1987 | Japan | 423/449 |

Primary Examiner—John Doll
Assistant Examiner—Robert M. Kunemund
Attorney, Agent, or Firm—Wigman & Cohen

[57] ABSTRACT

To obtain stable and high conductivity carbon fiber, hydrocarbon is thermodecomposed in vapor phase into carbon fiber with such a crystal structure that carbon hexagonal net planes thereof are arranged substantially in parallel to fiber axis and in annular ring growth fashion around the fiber axis, and then the carbon fiber is pulverized into 10 μm or less long carbon fiber. Since the carbon fiber is pulverized into relatively short length, when mixed with resin or rubber material without damaging the carbon crystal structure, it is possible to obtain stable and high conductivity resin or rubber material. Further, it is also possible to effectively infiltrate reactive substance to between the carbon hexagonal net planes to form further higher conductivity carbon intercalation compound.

2 Claims, 1 Drawing Sheet

HIGH CONDUCTIVITY CARBON FIBER

BACKGROUND OF THE INVENTION

1. Field of the Invention

The present invention relates generally to high conductivity carbon fiber, and more specifically to resin or rubber composite including gaseous phase growth carbon fiber high in conductivity, dispersibility and moldability, and stable in resistivity.

2. Description of the Prior Art

With the advance of electronic technology, there exists a strong demand for conductive composite material composed of carbon fiber and plastic or rubber, as static electricity or electromagnetic wave shielding material, which is light in weight, strong in strength, high in conductivity and excellent in moldability.

Conventionally, carbon black has been mixed with resin material in order to obtain conductive resin composite material. However, in conductive resin composite material mixed with carbon particles such as carbon black, since carbon black structure is easily destroyed by shearing force produced when carbon black is mixed with resin or when the resin is molded into a predetermined shape, there exists a problem in that the electric resistivity easily changes and therefore it is impossible to keep a required conductivity.

In general, carbon fiber has been manufactured by heat-treating organic raw material fiber such as polyacrylonitrile or rayon at about 2500° C. into carbon. Recently, however, it has been known that it is possible to obtain graphite fiber with ideal crystal structure and an improved conductivity by heat-treating gaseous phase growth carbon fiber at 2500° C. or higher. The above gaseous phase growth carbon fiber can be obtained by vapor phase thermodecomposing hydrocarbon together with metal or metallic compound. Further, the gaseous phase growth carbon fiber has such a crystal structure that carbon hexagonal net planes are arranged substantially in parallel to the fiber axis and further in annular ring growth fashion around the fiber axis (e.g. in Chemical Engineering Transaction, Volume 50; No. 3, Pages 42 to 49, 1986). Further, the method of manufacturing gaseous phase growth carbon fiber without depending upon substrates has been disclosed (e.g. in Japanese Patent Kokai Publication Nos. 58-180615, 60-54998, and 61-218661).

In particular, in Japanese Patent Kokai Application No. 61-218661, carbon fiber with a fiber diameter of 0.05 to 4 $\mu$m and an aspect ratio (length/dia. ratio in fiber) of 20 to 1000 is manufactured by introducing hydrocarbon and a specific organic metal compound or these together with a carrier gas into a reactive space for vapor phase thermodecomposition of the introduced hydrocarbon by catalyst reaction and further by heat-treating the obtained carbon fiber where necessary. The manufactured carbon fiber is mixed with rubber or plastic.

The above-mentioned carbon fiber is high in conductivity and little in crystal structure change as compared with the conventional carbon black or carbon fiber. In this improved carbon fiber, however, there still exist various problems in that carbon fiber entwines to each other when grown; the fiber length differs according to the reaction conditions; and therefore the dispersibility into resin or rubber is not uniform, so that it is difficult to put the fiber into practical use.

On the other hand, it has been proposed that it is possible to obtain intercalation compound with a very high conductivity by infiltrating reactive substances such as nitric acid or alkali metal compound to carbon net planes (in Japanese Patent Kokai Publication Nos. 59-179816 and 60-21806).

In the above-mentioned prior-art graphite intercalation compound, however, since carbon fiber manufactured by seeding fine metal particles on a substrate (i.e. on the basis of a substrate) is used as base material, there exists a problem in that it is difficult to form graphite intercalation compound.

In more detail, gaseous phase growth carbon fiber C can be shown in FIG. 1, in which both ends $C_1$ of the fiber are semispherical and further the hollow portion is small in cross-sectional area. Therefore, when the carbon fiber is heat-treated, since the crystal structure of the carbon fiber C grows up without changing the entire crystal structure, there exists a problem in that reactive compound cannot easily infiltrate into the carbon fiber C and therefore it is difficult to form graphite intercalation compound.

SUMMARY OF THE INVENTION

With these problems in mind, therefore, it is the primary object of the present invention to provide gaseous phase growth carbon fiber high in conductivity and dispersibility into resin and little in resistivity change.

It is another object of the present invention to provide stable high conductivity resin or rubber composite mixed with the above gaseous phase growth carbon fiber.

It is still another object of the present invention to provide gaseous phase growth carbon fiber to which reactive substance can easily be infiltrated into between carbon net planes so as to form further higher conductivity carbon intercalation compound.

To manufacture the high conductivity gaseous phase growth carbon fiber of the first aspect of the present invention, hydrocarbon is thermodecomposed in vapor phase to obtain carbon fiber with crystal structure such that carbon hexagonal net planes thereof are arranged substantially in parallel to the fiber axis and in annular ring growth fashion around the fiber axis and with 0.05 to 2 $\mu$m diameters and 1 to 4000 $\mu$m lengths; and then the obtained carbon fiber is pulverized into 10 $\mu$m or less long carbon fiber.

Further, it is preferable to heat the obtained fiber at 2000° to 3500° C. for 20 to 120 min. within an inert gas to develop and stabilize the crystal structure of the carbon fiber before or after the above pulverization.

To achieve the above-mentioned object, a high conductivity gaseous phase growth carbon fiber of the present invention is characterized by such a crystal structure that carbon hexagonal net planes are arranged substantially in parallel to a fiber axis and in annular ring growth fashion around the fiber axis and by the carbon fiber dimensions that the diameter is 0.05 to 2 $\mu$m and the length is 10 $\mu$m or less.

The above carbon fiber is mixed with resin or rubber to form high conductivity resin or rubber. Further, in the second aspect of the present invention, reactive substances can be infiltrated into between the carbon hexagonal net planes to form further higher conductivity graphite intercalation compound.

In summary, since the gaseous phase growth carbon fiber of the present invention is pulverized into 10 $\mu$m or less long fiber, it is possible to effectively prevent the carbon fiber from being entangled and therefore being sheared off when mixed with resin or rubber or molded into a desired shape; that is, it is possible to prevent the crystal structure of the carbon from being damaged, so that the carbon fiber and the resin or rubber mixed with the carbon fiber are high and stable in conductivity or resistivity. In other words, it is possible to consider that the carbon fiber can uniformly be dispersed into the resin or rubber material to form stable carbon resin or rubber composite.

In the same way, since the gaseous phase growth carbon fiber of the present invention is pulverized into 10 μm or less long fiber, it is possible to effectively infiltrate reactive substance to between the carbon hexagonal net planes to form further higher conductivity carbon intercalation compound.

BRIEF DESCRIPTION OF THE DRAWINGS

The features and advantages of the high conductivity gaseous phase growth carbon fiber and its application according to the present invention will be more clearly appreciated from the following description taken in conjunction with the accompanying drawings in which.

DETAILED DESCRIPTION OF THE PREFERRED EMBODIMENTS

Figure 1:
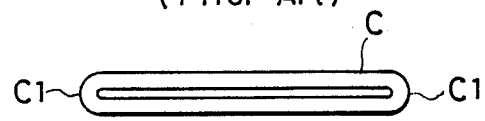
FIG. 1 is an illustrative cross-sectional view showing a crystal structure of the prior-art gaseous phase growth carbon fiber.

The gaseous phase growth carbon fiber (referred to as carbon fiber, hereinafter) of the first aspect of the present invention can be obtained by thermodecomposing hydrocarbon in vapor phase (i.e. vapor phase decomposed hydrocarbon). In the above carbon fiber, the hexagonal net planes of graphite or carbon easily conversed into graphite are substantially parallel to the fiber axis and the crystals are arranged in annual ring growth fashion around the fiber axis when observed through x-ray diffraction topography or electronic microscope.

The hydrocarbon is aromatic hydrocarbon such as toluene, benzene, naphthalene, etc.; or aliphatic hydrocarbon such as propane, ethane, ethylene, etc., and benzene and naphtalene are preferable.

In the above gaseous phase thermodecomposition, the hydrocarbon is gasified and then decomposed together with a carrier gas such as hydrogen at 900° to 1500° C. in contact with catalyst composed of ultrafine metallic particles (e.g. 10 to 300 Å particle-size iron, nickel, iron-nickel alloy, etc.) and floated within hydrocarbon thermodecomposition zone or in contact with a ceramic or graphite substrate on which the above ultrafine metallic particle catalyst is applied.

In the carbon fiber thus obtained, it has been recognized that the hexagonal net planes of graphite (or carbon easily converted into graphite) are arranged substantially in parallel to the fiber axes and in annual ring growth fashion as a result of x-ray diffraction topography or electronic microscope observation.

The diameter of these carbon fiber is 0.05 to 2 μm and the length thereof is 1 to 4000 μm. That is, there exists fairly large difference with respect to the fiber length.

The present invention is characterized in that the carbon fiber thus obtained is further pulverized mechanically before or after (preferably before) heat treatment in order to improve the dispersibility into resin.

The pulverizer is a ball mill, rotary spindle, cutting mill, homogenizer, vibration mill, attritor, etc. The fiber can be pulverized into half of the fiber length (preferably 10 μm or less) in length by these pulverizers.

In addition, where necessary, the pulverized carbon fiber is heat treated at 2000° to 3500° C., more preferably at 2500° to 3000° C. for 20 to 120 min., more preferably for 30 to 60 min. within an inert gas atmosphere such as argon to further enhance develop and stabilize the carbon hexagonal net plane arrangement parallel to fiber axis and the annual ring growth crystal arrangement around the fiber axis. If the heat treatment temperature is 2000° C. or lower, the crystal structure of the carbon fiber will not develop sufficiently. If the temperature is 3500° C. or higher, this is uneconomical because the crystal structure thereof cannot develop. If the heat treatment time is 20 min or shorter, the heat treatment is not sufficient and therefore the crystal structure is not uniform; if 120 min or longer, no special effect can be attained.

Therefore, the carbon fiber of the present invention includes both non-heat treated carbon fiber and heat treated carbon fiber.

The above-mentioned pulverized carbon fiber is mixed and kneaded with a synthetic resin to obtain high conductivity resin or rubber composition. The resin material to be mixed with the graphite fiber of the present invention is a thermoplastic resin such as polyethylene, polypropylene, polyvinyl chloride, ethylene, vinyl acetate inter polymer, ethylene-acrylic ester inter polymer; a thermosetting resin such as silicon resin, phenol resin, urea resin, epoxide resin, etc,; or synthetic rubber such as chloroprene, chlorosulfonic polyethylene, chlorinated polyethylene, ethylene-propylene rubber, silicon rubber, acrylic rubber, fluorine rubber, etc.

Further, an ordinary kneader such as a two-roller mill, inter mixer, etc. is used to disperse the pulverized carbon fiber into the synthetic resin.

The amount of addition of the carbon fiber is not limited. However, 5 to 200 parts by weight of carbon fiber, preferably 10 to 100 parts by weight is mixed with 100 parts by weight of resin according to the required electric resistivity and moldability, etc.

Further, various molding methods can be applied such as extrusion molding, injection molding, transfer molding, press molding, etc. according to the shapes of the molded resin articles.

Furthermore, it is also possible to add an addition agent such as filling agent, assistant agent, antioxidant agent, cross linking agent, etc., where necessary.

EXAMPLE 1

Iron particles of particle size from 100 to 300 Å were floated within a vertical tubular-shaped electric furnace kept at 1000° to 1100° C. A mixture gas of benzene and hydrogen was introduced into this furnace for vapor thermodecomposition. The obtained carbon fiber was 10 to 1000 μm in length and 0.1 to 0.5 μm in diameter. The carbon fiber thus obtained was pulverized for 20 min. with a planetary type ball mill (Model No. P-5 made by FRITSCH JAPAN CO., LTD.) by driving the motor at 500 r.p.m, and further pulverized for 3 min. with a rotor speed mill (Model No. P-14 made by FRITSCH JAPAN CO., LTD.) driven at 20,000 r.p.m. The pulverized carbon fiber was passed through a sieve ring with meshes of 0.08 μm.

The pulverized carbon fiber was them put into an electric furnace filled with argon and kept at 2960° to 3000° C. for 30 min. for graphitization. With respect to the obtained graphite fiber, it was confirmed by an x-ray diffraction topography and an electronic microscope that the carbon hexagonal net planes were arranged substantially in parallel to the fiber axis and in annular ring growth crystal structure around the fiber axis, and the fiber length was pulverized down to 3 to 5 μm.

The pulverized graphite fiber was added to 100 parts by weight of low-density polyethylene "MIRASON 3530" (Trademark of Mitsui Petrochemistry Corp.) at the mixture ratios shown in Table 1, and thereafter mixed and kneaded with a roll mill (6 inch×2) for about 60 min to obtain Samples A, B and C.

In the above 60-min mixing process, three samples were taken three times (after 20, 40 and 60 min.) to form sheets with a 70 mm length, a 10 mm width and a 1 mm thickness by a press machine for each Sample A, B or C. The both ends of each sheet were painted by silver. The resistances of these sheets were measured by a Wheatstone bridge to obtain the relationship between the kneading time and the resistance.

Further, Sample D (100 wt. part MIRASON 3530 was added to 40 wt. part pulverized graphite fiber and kneaded for 60 min. with a two-roll mill) was formed into pellets through a pelletizer, inserted into a 200 mm extruder to extrusion mold the graphite fiber onto polyethylene wire (cross-linked by light irradiation) at 200° to 250° C. in the form of sheet with a thickness of 0.5 mm for confirmation of moldability.

In comparison of the pulverized graphite fiber of the present invention with non-pulverized graphite fiber and other carbon black such as Ketzen Black EC (Trademark of Lion Akzo Co.) and Milled Fiber MLD-30 (Trademark of TORE Corp.) added to polyacrylnitrile based carbon fiber, the similar test were made. The test results of the resistance are listed in Table 1.

TABLE 2

| | Moldability |
|---|---|
| Sample D (Invention) | 8-hour continuous extrusion molding of 0.5 mm thick sample is possible. Good appearance. |
| Sample F (Comparison) | Extrusion molding of 0.5 mm thick sample is possible. But short shot (insufficient resin supply) occurs. |
| Sample H (Comparison) | Extrusion molding of 0.5 mm thick sample is impossible due to an increase in resin viscosity. |
| Sample J (Comparison) | Extrusion molding of 0.5 mm thick sample is possible. But the surface is not smooth. |

The table 2 indicates that the graphite fiber of the present invention is excellent in moldability and external appearance as compared with comparative Samples.

EXAMPLE 2

An acid anhydride based hardening agent "EPICURE YH-307" (Trademark of YUKA SHELL EPOXY CO., LTD.) and a hardening accelerator "EPICURE EMI-24" (Trademark of YUKA SHELL EPOXY CO., LTD.) were added to epoxy resin (thermosetting resin) "EPIKOTE 828" (Trademark of YUKA SHELL EPOXY CO., LTD.) Further, pulverized graphite fiber the same as in Example 1 was mixed with the above mixture at two different mixture rates and molded into bumbell-shaped test pieces (No. 4 of JISK 6301) through a transfer molding machine.

To mix and knead graphite fiber, the "EPIKOTE 828" and graphite fiber were put into an agitator and mixed for about 60 min. The mixed substance was passed through three rollers after a hardening agent and an accelerator had been added, and supplied to a transfer molding machine.

Table 3 shows the mixture rates, and the measured resistivity thereof.

Table 3 further shows the test results of comparative Samples M, N, O, and P obtained by mixing non-pulverized graphite fiber and polyacrylonitrile based carbon fiber with the resin including "EPIKOTE 828", "EPICURE YH-307" and "EPICURE EMI-24". The hard-

TABLE 1

| | Invention Samples | | | | Comparative Samples | | | | | |
|---|---|---|---|---|---|---|---|---|---|---|
| | A | B | C | D | E | F | G | H | I | J |
| | Mixture rate (wt. parts) | | | | | | | | | |
| MIRASON 3530 | 100 | 100 | 100 | 100 | 100 | 100 | 100 | 100 | 100 | 100 |
| Pulverized graphite fiber | 10 | 20 | 30 | 40 | | | | | | |
| Non-pulverized graphite fiber | | | | | 20 | 40 | | | | |
| Ketzen black EC | | | | | | | 20 | 40 | | |
| MLD-30 | | | | | | | | | 20 | 40 |
| | Resistivity (ohm-cm) | | | | | | | | | |
| After 20 min | 18.9 | 6.8 | 1.43 | 0.20 | 15.6 | 3.4 | 16.9 | 2.8 | 48.9 | 11.3 |
| After 40 min | 19.3 | 6.8 | 1.42 | 0.22 | 14.8 | 3.2 | 21.3 | 3.6 | 49.3 | 11.3 |
| After 60 min | 19.4 | 6.8 | 1.43 | 0.21 | 14.3 | 2.9 | 34.5 | 4.6 | 49.8 | 11.3 |

Table 1 indicates that the resistance of the graphite fibers A, B, C or D of the present invention (pulverized graphite fiber is added to MIRASON 530) is relatively low in resistivity and also little in resistivity change as compared with other comparative graphite fiber Samples E, F, G, H, I, or J.

Table 2 shows each test result of extrusion molding of the Samples D, E, H and J.

ening conditions shown in Table 3 were 80° C.×3 hours.

TABLE 3

| | Invention Samples | | Comparative Samples | | | |
|---|---|---|---|---|---|---|
| | K | L | M | N | O | P |
| | Mixture rate (wt. parts) | | | | | |
| EPIKOTE 828 | 100 | 100 | 100 | 100 | 100 | 100 |
| EPICURE YH-307 | 110 | 110 | 110 | 110 | 110 | 110 |
| EPICURE EMI-29 | 1 | 1 | 1 | 1 | 1 | 1 |
| Pulverized | 50 | 100 | | | | |

TABLE 3-continued

|  | Invention Samples | | Comparative Samples | | | |
| --- | --- | --- | --- | --- | --- | --- |
|  | K | L | M | N | O | P |
|  | Mixture rate (wt. parts) | | | | | |
| graphite fiber Non-pulverized graphite fiber |  |  | 50 | 100 |  |  |
| PAN carbon fiber (MLD-30) |  |  |  |  | 50 | 100 |
| Resistivity (ohm-cm) | 0.43 | 0.098 | 0.98 | 0.23 | 1.43 | 0.83 |

Table 4 shows each test result of extrusion molding of the Samples.

TABLE 4

|  | Moldability |
| --- | --- |
| Sample K (Invention) | Very good |
| Sample L (Invention) | Very good |
| Sample M (Comparison) | Fiber lump clogs gate. Short shot occurs at 3 per 10 shots. |
| Sample N (Comparison) | Fiber lump clogs gate. Short shots occurs at 6 per 10 shots. |
| Sample O (Comparison) | No problem occurs, but the surface is not smooth. |
| Sample P (Comparison) | The surface is rough into defective appearance. |

Tables 3 and 4 indicate that epoxy resin mixed with pulverized graphite fiber is low in resistivity and good in moldability.

EXAMPLE 3

One hundred parts by weight of chlorosulfonic polyethylene rubber "Hypalon 45" (Trademark of Du Pont Corp) was mixed with 500 parts by weight of pulverized carbon fiber before heat treatment in the same way as in Example 1.

The mixture was sufficiently mixed and kneaded by two rollers, put into an agitator together with toluene, and mixed for 48 hours to obtain paint including 25% solid matter. Further, in the above step, 2.5 parts by weight of antioxidant was also added.

In the same way, paint was prepared by mixing the rubber with non-pulverized carbon fiber or PAN based carbon fiber "MLD-30" to obtain comparative Samples R and S. These paints thus prepared was applied onto a polyester film as film, and the resistance was measured by pushing knife-edge electrodes thereupon. At the same time, the film coating conditions were observed. Tables 5 and 6 show these test results.

TABLE 5

|  | Invention Sample | Comparative Samples | |
| --- | --- | --- | --- |
|  | Q | R | S |
|  | Mixture rate (wt. parts) | | |
| Hypalon 45 | 100 | 100 | 100 |
| Antioxidant | 2.5 | 2.5 | 2.5 |
| Pulverized graphite fiber | 50 |  |  |
| Non-pulverized graphite fiber |  | 50 |  |
| PAN carbon fiber |  |  |  |
| Toluene | 458 | 458 | 458 |
| Resistivity (ohm-cm) | 0.68 | 1.04 | 1.92 |

Table 6 shows the painted film conditions of Samples.

TABLE 6

|  | Painted film conditions |
| --- | --- |
| Example Q (Invention) | Good paint film can be formed. Good appearance. Paint can be thinned without presence of foreign matter. |
| Example R (Comparison) | When paint is thinned by doctor knives, since foreign matter is caught by the knives, holes are formed in the paint film out of practical use. |
| Example S (Comparison) | Rough surface paint. Poor appearance. Carbon fiber lumps are present. |

Tables 5 and 6 indicate that rubber (Hypalon) mixed with pulverized graphite fiber is low in resistivity and good in paint application and appearance.

The second aspect of the present invention will be described hereinbelow.

As already described, the graphite fiber of the present invention is characterized in that the carbon hexagonal net planes are arranged substantially in parallel to the fiber axis and in annular ring growth crystal structure around the fiber axis. In addition, since the graphite fiber is pulverized, reactive substances can easily be infiltrated into the graphite crystal to form graphite intercalation compound (in which reactive substances can be located between the parallel-arranged net planes of the carbon crystals).

In practice, the above reactive substances are nitric acid, sulfuric acid, alkalimetal, halogenide of alkali metal, etc.

The conductivity of the graphite intercalation compound thus obtained is several to several tens times higher than that of the pulverized graphite fiber to which no reactive substances are infiltrated.

In the same way as in the first aspect of the present invention, the graphite intercalation compound is mixed with and dispersed into a synthetic resin. The resin material is thermoplastic resin, thermosetting resin, or synthetic rubber. The above-mentioned conductive resin composite can be used as various electric material such as conductive material, buttery material, hydrogen absorbing material, catalyst material, etc.

EXAMPLE 4

Iron particles of particle size from 100 to 300 Å were floated within a vertical tubular-shaped electric furnace kept at 1000° to 1100° C. A mixture gas of benzene and hydrogen was introduced into this furnace for vapor thermodecompositions. The obtained carbon fiber was 10 to 1000 $\mu$m in length and 0.1 to 0.5 $\mu$m in diameter. The carbon fiber thus obtained was pulverized for 20 min. in a planetary type ball mill (Model No. P-5 made by FRITSCH JAPAN CO., LTD.) by driving the motor at 1350 r.p.m., the disk at 200 r.p.m. and the pot at 440 r.p.m.

The pulverized carbon fiber was then put into an electric furnace filled with argon and kept at 2960° to 3000° C. for 30 min for graphitization.

With respect to the obtained graphite fiber, it was confirmed by use of an x-ray diffraction topography and an electronic microscope that the carbon hexagonal net planes were arranged substantially in parallel to the fiber axis and in annular ring growth crystal structure around the fiber axis, and the fiber was 3 to 5 $\mu$m in length.

The graphite fiber thus obtained was put into a vessel including fuming mitric acid (99% in concentration) and kept at 15° C. for 1 hour with this vessel enclosed.

After one hour, graphite fiber is separated from the nitric acid through filter, sufficiently washed by distilled water, and then dried for 24 hours within a desicator.

The obtained graphite fiber treated by fuming nitric acid (graphite intercalation compound) was measured with respect to pitch Ic (Å in unit) along the C-axis crystal direction on the basis of x-ray diffraction method. The measured results are shown in Table 7.

Figure 2:
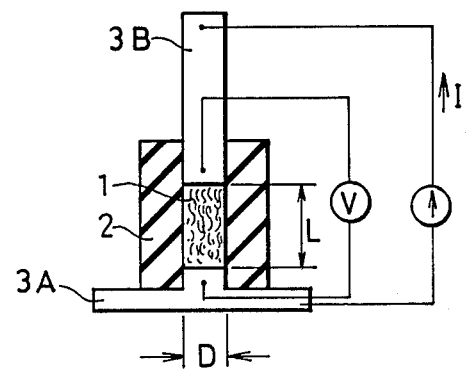
FIG. 2 is an illustration showing a measurement jig used to measure the relationship between apparent density and volume resistivity (specific resistance) of pulverized carbon fiber and carbon intercalation compound of the present invention.

Further, the relationship between the apparent density and the volume resistivity of the graphite fiber treated by fuming nitric acid were measured with a jig as shown in FIG. 2.

In FIG. 2, the graphite fiber 1 treated by nitric acid (1 g in weight) was inserted into an insulated cylindrical member whose internal diameter was 1 cm, and sandwiched between a first brass electrode 3A and a second brass electrode 3B.

Constant current of 10 mA was passed through the graphite fiber 1 and voltages across the graphite fiber 1 was measured to obtain the apparent density and the volume resistivity of the graphite fiber 1 in accordance with the following fomulae:

$$\text{Density } d = \frac{4 \times W}{D^2 \times \pi \times L} \text{ (g/cm}^3\text{)}$$

$$\text{Resistance } R = \frac{V}{I} \text{ (ohm)}$$

$$\text{Volume resistivity } \rho = \frac{D^2 \times \pi \times R}{4 \times L} \text{ (ohm-cm)}$$

where W denotes the fiber weight; D denotes the fiber diameter; L denotes the fiber length; V denotes the voltage across the fiber; and I denotes the current (10 mA) passed through the fiber.

For comparison, the relationship between the apparent density d and the volume resistivity $\rho$ was measured with respect to non-pulverized graphite fiber treated by fuming nitric acid and pulverized graphite fiber not treated by fuming nitric acid.

The above test results are all listed in Table 7.

TABLE 7

|  | Invention | Comparison | |
| --- | --- | --- | --- |
|  | Pulverized n.a. treated graphite fiber | Non-pulverized n.a. treated graphite fiber | Pulverized n.a. non-treated graphite fiber |
| Ic (Å) | 21.42 | 3.354 | 3.354 |
| Apparent density (g/cm2) | Volume resistivity (ohm-cm) | | |
| 0.32 | $3.1 \times 10^{-2}$ | $3.8 \times 10^{-1}$ | $3.9 \times 10^{-1}$ |
| 0.36 | $1.4 \times 10^{-2}$ | $2.7 \times 10^{-1}$ | $2.5 \times 10^{-1}$ |
| 0.42 | $7.9 \times 10^{-3}$ | $2.1 \times 10^{-1}$ | $2.3 \times 10^{-1}$ |
| 0.51 | $4.4 \times 10^{-3}$ | $1.4 \times 10^{-1}$ | $1.2 \times 10^{-1}$ |
| 0.64 | $2.4 \times 10^{-3}$ | $1.0 \times 10^{-1}$ | $0.98 \times 10^{-1}$ |
| 0.85 | $8.6 \times 10^{-4}$ | $7.1 \times 10^{-2}$ | $7.4 \times 10^{-2}$ |
| 0.97 | $7.3 \times 10^{-4}$ | $6.0 \times 10^{-2}$ | $5.8 \times 10^{-2}$ |
| 1.16 | $5.4 \times 10^{-4}$ | $4.8 \times 10^{-2}$ | $4.4 \times 10^{-2}$ |
| 1.27 | $4.9 \times 10^{-4}$ | $4.3 \times 10^{-2}$ | $4.2 \times 10^{-2}$ |

Table 7 indicates that the graphite intercalation compound obtained by treating pulverized graphite fiber with nitric acid is very low in resistivity and therefore excellent in conductivity, as compared with that of the non-pulverized graphite fiber treated by nitric acid or the pulverized graphite fiber not-treated by nitric acid.

EXAMPLE 5

The carbon fiber formed in the same way as in Example 4 was further pulverized for 10 sec. with a rotor speed mill (Model No. P-14 made by FRITSCH JAPAN CO., LTD.) at rotor speed 20000 r.p.m. The pulverized carbon fiber was passed through a sieve ring with meshes of 0.08 mm.

The above pulverized carbon fiber was heat-treated in the same way as in Example 4 to obtain pulverized graphite fiber.

It was confirmed by use of an x-ray diffraction topography and an electronic microscope that the carbon hexagonal net planes were arranged substantially in parallel to the fiber axis and in annular ring growth crystal structure around the fiber axis, and the fiber length was 1 to 4 μm.

Figure 3:
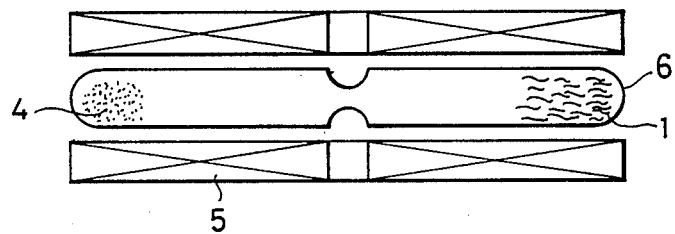
FIG. 3 is an illustration for assistance in explaining a device used to produce graphite fiber treated by ferric chloride (i.e. graphite intercalation compound).

The pulverized graphite fiber 1 thus obtained was put into a glass ampule 6 together with ferric chloride 4 as shown in FIG. 3 and heat-treated within an electric furnace 5 for 32 hours at $T_1 = 275°$ C. on the pulverized graphite fiber 1 side and at $T_4 = 185°$ C. on the ferric chloride 4 side under a vacuum of $1 \times 10^{-4}$ Torr, in accordance with so-called Two-bulb method, in order to infiltrate reactive substance to between parallel-arranged net planes of the carbon crystals (i.e. for intercalation).

Table 8 shows the apparent density and the volume resistivity of the graphite fiber treated by ferric chloride (intercalation compound) measured in the same way as in Example 4. For comparison, those of non-pulverized graphite fiber treated by nitric acid are also listed in Table 8.

TABLE 8

|  | Invention Pulverized f.c. treated graphite fiber | Comparison Non-pulverized f.c. treated graphite fiber |
| --- | --- | --- |
| Apparent density (g/cm³) | Volume resistivity (ohm-cm) | |
| 0.34 | $1.1 \times 10^{-2}$ | $2.9 \times 10^{-1}$ |
| 0.38 | $8.8 \times 10^{-3}$ | $2.3 \times 10^{-1}$ |
| 0.42 | $6.4 \times 10^{-3}$ | $1.8 \times 10^{-1}$ |
| 0.50 | $4.6 \times 10^{-3}$ | $1.2 \times 10^{-1}$ |
| 0.62 | $1.9 \times 10^{-3}$ | $1.0 \times 10^{-1}$ |
| 0.90 | $8.1 \times 10^{-4}$ | $6.9 \times 10^{-2}$ |
| 0.98 | $6.2 \times 10^{-4}$ | $6.0 \times 10^{-2}$ |
| 1.22 | $3.6 \times 10^{-4}$ | $4.6 \times 10^{-2}$ |
| 1.28 | $2.8 \times 10^{-4}$ | $4.2 \times 10^{-2}$ |

Table 8 indicates that the pulverized graphite treated by ferric chloride (i.g. graphite intercalation compound) of the present invention is low in resistivity, as compared with non-pulverized ferric chloride treated graphite fiber, and therefore excellent in conductivity.

As described above, in the high conductivity carbon fiber or the resin or paint including the high conductivity carbon fiber (inclusive the graphite intercalation compound) according to the present invention comprises the following advantages:

(1) The carbon fiber is low in resistivity and good in dispersibility into various synthetic resin, (2) The carbon fiber is well mixable with synthetic resin, and the obtained resin composite is good in moldability, (3) Since the fiber diameter is very small, the carbon fiber can be applied to resin composite required to be molded into a film state, (4) The resin composite including carbon fiber is stable and high in quality, and (5) The conductive resin composite is usable as various electric material such as conductive material, battery material, hydrogen absorbing material, catalyst material, etc.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A high conductivity resin, comprising;
   (a) 5 to 200 wt. parts of a pulverized graphite fiber of 0.05 to 2 $\mu$m in diameter and 10 $\mu$m or less in length with crystal structure such that carbon hexagonal net planes are arranged substantially in parallel to a fiber axis and in annular ring growth fashion around the fiber axis;
   (b) 100 wt. parts of synthetic resin kneaded with said graphite fiber so that said graphite fiber is dispersed into said synthetic resin; and
   (c) reactive substances infiltrated to between the carbon hexagonal net planes, to form higher conductivity carbon intercalation compound by reacting the graphite fiber with reactive substance.

2. A high conductivity rubber, comprising;
   (a) 5 to 200 wt. parts of a pulverized graphite fiber of 0.05 to 2 $\mu$m in diameter and 20 $\mu$m or less in length with crystal structure such that carbon hexagonal net planes are arranged substantially in parallel to a fiber axis and in annular ring growth fashion around the fiber axis;
   (b) 200 wt. parts of rubber kneaded with said graphite fiber so that said graphite fiber is dispersed into said rubber; and
   (c) reactive substances infiltrated to between the carbon hexagonal net planes, to form higher conductivity carbon intercalation compound by reacting the graphite fiber with reactive substance.

* * * * *